(12) United States Patent
Lewin

(10) Patent No.: US 12,367,635 B2
(45) Date of Patent: Jul. 22, 2025

(54) SKIN MICROSTRUCTURE TEXTURE FILTERING FOR RUNTIME FACIAL ANIMATIONS

(71) Applicant: Electronic Arts Inc., Redwood City, CA (US)

(72) Inventor: Chris Lewin, Guildford (GB)

(73) Assignee: Electronic Arts Inc., Redwood City, CA (US)

(*) Notice: Subject to any disclaimer, the term of this patent is extended or adjusted under 35 U.S.C. 154(b) by 173 days.

(21) Appl. No.: 18/374,358

(22) Filed: Sep. 28, 2023

(65) Prior Publication Data

US 2025/0111580 A1    Apr. 3, 2025

(51) Int. Cl.
| | |
|---|---|
| *G06T 15/04* | (2011.01) |
| *G06T 5/20* | (2006.01) |
| *G06T 5/70* | (2024.01) |
| *G06T 5/73* | (2024.01) |
| *G06T 13/40* | (2011.01) |

(52) U.S. Cl.
CPC .............. *G06T 15/04* (2013.01); *G06T 5/20* (2013.01); *G06T 5/70* (2024.01); *G06T 5/73* (2024.01); *G06T 13/40* (2013.01); *G06T 2207/30201* (2013.01)

(58) Field of Classification Search
CPC ........... G06T 13/40; G06T 5/70; G06T 15/04; G06T 5/73; G06T 5/20; G06T 2207/30201
See application file for complete search history.

(56) References Cited

U.S. PATENT DOCUMENTS 7,443,394 B2 * 10/2008 Anderson ............. G06T 15/506
                                                         345/426
7,454,039 B2 * 11/2008 Tu ....................... G06V 10/7553
                                                         382/209

(Continued)

OTHER PUBLICATIONS

Nagano et al., "Skin Microstructure Deformation With Displacement Map Convolution," *ACM Transactions on Graphics*, vol. 34, Issue 4, Article No. 109, pp. 1-10 (Aug. 2015).

(Continued)

*Primary Examiner* — Vinh T Lam
(74) *Attorney, Agent, or Firm* — Leydig, Voit & Mayer, Ltd.

(57) ABSTRACT

A method of skin microstructure texture filtering for facial animation includes obtaining a plurality of one-dimensional (1D) filtered tiles corresponding to a plurality of filter axis angles and a plurality of filter parameters applied to a neutral tile, and at runtime, for each pixel representing a region of human skin, determining a principal direction of deformation, a principal filter parameter corresponding to the principal direction of deformation, and a secondary filter parameter corresponding to a secondary direction of deformation orthogonal to the principal direction of deformation, and selecting a first 1D filtered tile among the plurality of 1D filtered tiles, the first 1D filter tile corresponding to the secondary direction of deformation and the secondary filter parameter, and generating a respective two-dimensional (2D) filtered tile by convolving the first 1D filtered tile with a second 1D filter kernel corresponding to the principal direction of deformation and the principal filter parameter.

20 Claims, 9 Drawing Sheets

(56) References Cited

U.S. PATENT DOCUMENTS

| | | | | |
|---|---|---|---|---|
| 7,768,528 B1* | 8/2010 | Edwards | ............. | G11B 27/036 |
| | | | | 345/473 |
| 9,460,541 B2* | 10/2016 | Li | ........................... | G06T 13/80 |
| 10,997,768 B2* | 5/2021 | Barlier | ................ | G06V 40/175 |
| 11,532,112 B2* | 12/2022 | Barlier | ................ | G06V 40/171 |
| 12,045,923 B2* | 7/2024 | Barlier | ................... | G06T 13/40 |
| 2007/0127844 A1* | 6/2007 | Watanabe | ........... | G06V 40/171 |
| | | | | 382/276 |
| 2016/0042548 A1* | 2/2016 | Du | ......................... | G06T 13/40 |
| | | | | 345/473 |

OTHER PUBLICATIONS

Bourke, Paul. "Tiling Textures on the Plane (Part 1)" (Sep. 1992) (available at: https://paulbourke.net/geometry/tiling/).

Barré-Brisebois et al. "Blending in Detail," Self Shadow (Jul. 10, 2012) (available at: https://blog.selfshadow.com/publications/blending-in-detail/).

* cited by examiner

SKIN MICROSTRUCTURE TEXTURE FILTERING FOR RUNTIME FACIAL ANIMATIONS

FIELD

This disclosure generally relates to computer graphics and, more particularly, to systems and methods related to skin microstructure texture filtering.

BACKGROUND

In rendering characters using computer graphics, such as in games and movies, it is desirable to simulate human faces as realistic as possible. Facial skin, like other parts of the character, is usually represented by a polygonal mesh (e.g., triangle mesh). A texture is then added to the triangular mesh.

Human facial skin has a lot of detail. For example, human facial skin has certain static texture, such as bumps, pores, and the like. Human skin can also have dynamic texture. For example, wrinkles can appear when a face makes certain expressions. There are different levels of detail in facial skin animation. First, the triangles in the polygonal mesh need to be moved around. This may be referred to as the macrostructure detail. Second, wrinkles may appear or disappear as the face is deformed. This may be referred to as the mesostructure detail (e.g., on a scale from a centimeter down to about one tenth of a millimeter). The term microstructure, as used herein, refers to skin features at a scale below a tenth of a millimeter (e.g., 10 microns). At the microstructure level, individual pores and creases on the human skin are simulated. When light is directly shined on an area of the skin, such microstructure details can be noticeable.

When the facial skin moves, the skin may be stretched or compressed. For example, when the cheek is popped out, the pores in the cheek may be stretched (e.g., similar to an expanding balloon). For certain facial expressions (e.g., an angry expression), some areas of the facial skin may be compressed. If only microstructure and mesostructure is considered in the animation, the facial skin can appear plastic or shiny, giving unrealistic results. Thus, for more realistic appearances in facial animation, skin dynamic microstructure should be included.

SUMMARY

Embodiments of the disclosure provide a method, computer-readable storage medium, and device for skin microstructure texture filtering for facial animation. The method includes obtaining a plurality of one-dimensional (1D) filtered tiles corresponding to a plurality of filter axis angles and a plurality of filter parameters applied to a neutral tile. The neutral tile includes a microstructure texture of human skin. The method further includes, at runtime, for each pixel representing a region of human skin, determining a principal direction of deformation, a principal filter parameter corresponding to the principal direction of deformation, and a secondary filter parameter corresponding to a secondary direction of deformation orthogonal to the principal direction of deformation, and selecting a first 1D filtered tile among the plurality of 1D filtered tiles, the first 1D filter tile corresponding to the secondary direction of deformation and the secondary filter parameter, and generating a respective two-dimensional (2D) filtered tile by convolving the first 1D filtered tile with a second 1D filter kernel corresponding to the principal direction of deformation and the principal filter parameter.

DETAILED DESCRIPTION

Figure 1:
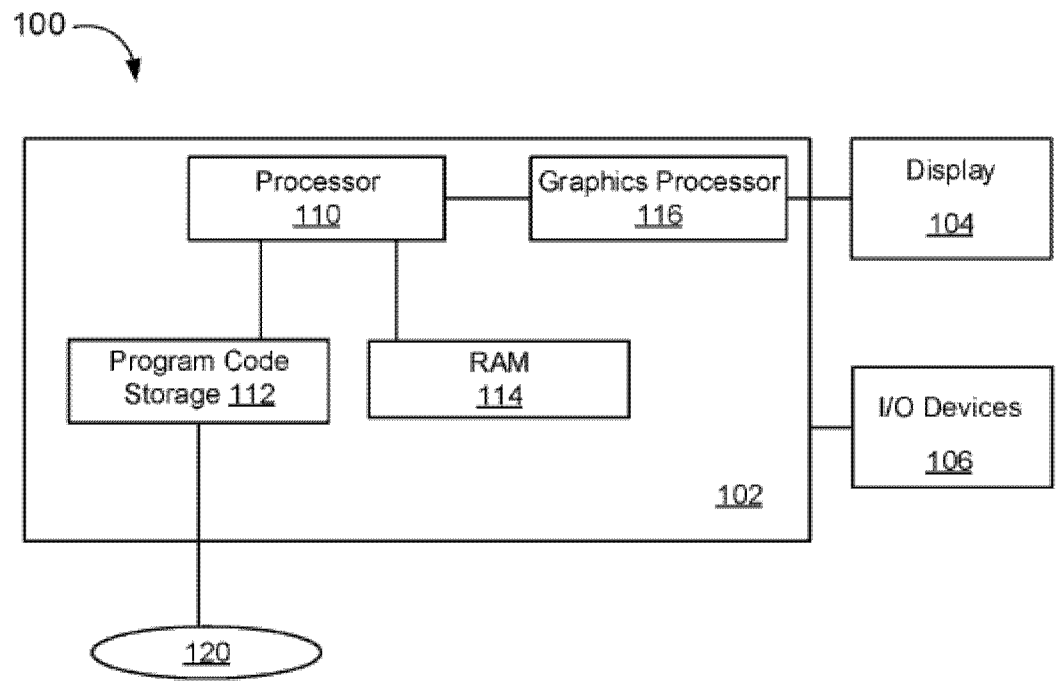
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of this disclosure provide a system and method for skin microstructure texture filtering during runtime facial animation. The system applies a two-pass filter on regions of tiled microstructure texture to improve the visual fidelity of facial skin during facial animation. The filter can be a blurring filter or a sharpening filter, depending on whether the skin is stretched or compressed, respectively. Skin tends to appear smoother when stretched and rougher when compressed. In one embodiment, the system emulates the effects of skin stretching or compression by blurring or sharpening the microstructure texture in the pixel shader.

For a nearly symmetric filter kernel (e.g., a Gaussian kernel), a two-dimensional (2D) filtering operation can be estimated as two sequential one-dimensional (1D) filtering operations in two mutually orthogonal directions, referred to as a separable filter. In a first pass, a neutral microstructure texture is filtered along a first direction to obtain an intermediate microstructure texture. In a second pass, the intermediate microstructure texture is filtered along a second direction orthogonal to the first direction to obtain a final filtered microstructure texture. Estimating a 2D filtering operation as two sequential 1D filtering operations is referred to as a two-pass filtering operation. By separating the 2D filtering operation into two sequential 1D filtering operations, the computational cost is reduced from $O(N^2)$ to $O(2N)$ for an N×N filtering kernel size. On the other hand, in the two-pass filtering operation, the intermediate microstructure texture after applying the first pass would need to be saved in a memory, so that the results of the first pass can be queried when the second pass can be subsequently applied.

According to embodiments of this disclosure, multiple instances of the 1D filter are precomputed per microstructure tile at various filter axis angles and at various filter strengths (e.g., various degrees of stretching or compression). Thus, an array of 1D filtered tiles are generated and stored in a memory, each element of the array corresponding to a respective filter axis angle and a respective filter strength. At runtime, for each pixel of the pixel shader that is determined to include skin (e.g., not occluded), the system is configured to determine a principal direction of deformation and the secondary direction of deformation, as well as the a principal filter strength and a secondary filter strength associated with the principal direction and the secondary direction, respectively, based on the deformation of the corresponding triangle in the triangular mesh with respect to that in the neutral triangular mesh. For the first pass of the filter, the system selects an element of the precomputed array of 1D filtered tiles that corresponds to the secondary direction of deformation and the secondary filter strength. The system then applies the second pass of the filter corresponding to the principal direction of deformation and the principal filter strength to the selected element. In some embodiments, the principal direction of deformation is chosen as the direction in which the filter strength is stronger (e.g., the principal filter strength has an absolute value that is greater than an absolute value of the secondary filter strength). In this way, filtering in the more important direction of deformation is calculated at runtime for better fidelity.

According to some embodiments, a microstructure tile can be relatively small (e.g., covering a 5 mm×5 mm area, or about 256×256 pixels). The microstructure tile is then tiled across an image of a face. Storing the precomputed array of 1D filtered tiles may not substantially affect memory. For example, the array of 1D filtered tiles can be precomputed for 12 different angles (e.g., every 15 degrees) and 16 different filter strengths. The array would include 192 elements of 1D filtered tiles. This precomputed data can take as little as about 2 to 24 MB of memory in some example implementations. Some embodiments could decrease the number of angles and strengths that are precomputed to produce a smaller tile array, which may impact quality. By querying the precomputed results for the first pass of the filtering, applying the second pass of the filter can then be performed more efficiently.

According to some embodiments, because the microstructure tile is small and is tiled across the image of a face, the system can use periodic boundary conditions when performing the filter operation to match how the tiles are sampled at runtime. Pixels that are identified as being on one edge of the microstructure tile are wrapped around to the opposite edge of the microstructure tile. This can ensure that there are no seams or other artifacts in the final result. Although some embodiments of the disclosure are described in the context of facial skin, other embodiments can be used in the context of any kind of skin and/or skin of any body part.

Taking the context of video games as an example, the display of a video game is generally a video sequence presented to a display capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds or 16 ms. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
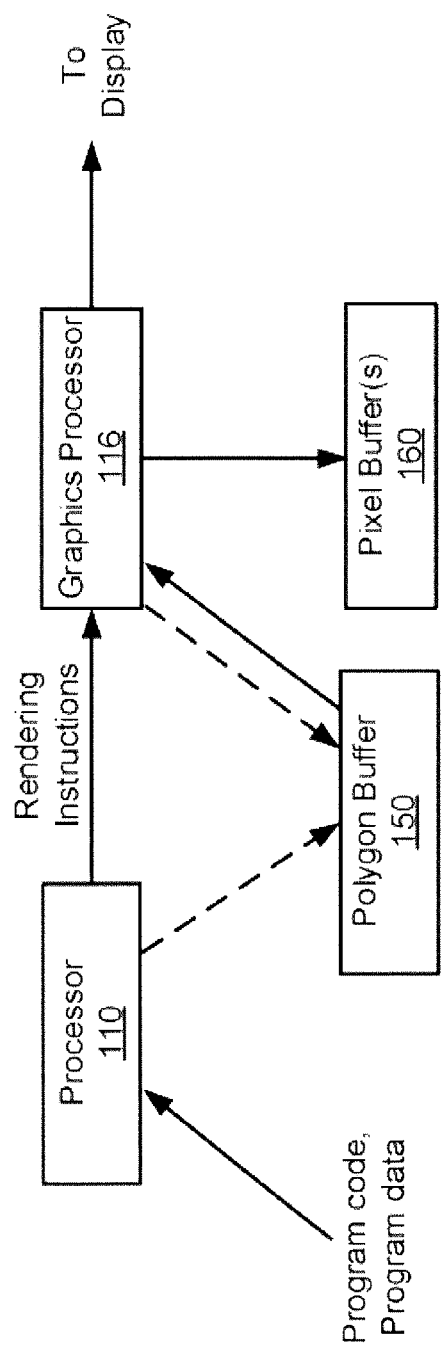
FIG. 2 is a block diagram illustrating processor and buffer interaction, according to an embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

It may be desirable to render photorealistic images of human skin for movies and games. Skin appearances can vary across individuals, as well as spatially and temporally within a single individual. For example, the color, the surface roughness, and the translucency of skin can vary greatly over different parts of the body (e.g., the face, the elbow, the knee, and the like), and even over different parts of the face, such as the chin, the forehead, and the cheek. In addition, emotions, health, physical activity, and cosmetics can affect the visual appearance of skin. Rendering human skin can be challenging. Human skin has many subtle visual characteristics, and human viewers are acutely sensitive to the appearance of skin in general and faces in particular. A realistic model of skin must include wrinkles, pores, freckles, hair follicles, scars, and so on.

The level of detail of skin rendering in computer graphics can be divided into three structures: macrostructure, mesostructure, and microstructure. At the macrostructure level, a geometric model of a human face is represented as a polygonal mesh, such as a triangular mesh. It can be acquired by a 3D scanning device, photographs, a geometric modeling application, and the like.

A texture map can then be applied to the 3D polygonal mesh. Texture mapping provides a method to map colors of pixels from a 2D texture to a 3D surface, analogous to "wrapping" a 2D image around a 3D object. In the advent of multi-pass rendering, texture mapping can also include more complex mappings, such as height mapping, bump mapping, normal mapping, displacement mapping, reflection mapping, specular mapping, occlusion mapping, and the like. These techniques make it possible to create near-photorealistic images of human skin.

Bump maps create the illusion of depth and texture on the surface of a 3D model using computer graphics. Textures are artificially created on the surface of objects using grayscale and lighting tricks, rather than having to manually create individual bumps and cracks.

As in bump maps, normal maps also create the illusion of depth detail on the surface of a model. Instead of using grayscale values, normal maps use RGB (red, green, blue) information that corresponds directly with the X, Y and Z axis in 3D space. This RGB information tells the 3D application the exact direction of the surface normals are oriented in for each polygon. The orientation of the surface normals, tell the 3D application how the polygon should be shaded. There are two different types of normal maps: tangent space normal maps and object space normal maps. Tangent space normal maps usually work better for meshes that have to deform during animation, such as meshes representing characters.

Displacement maps physically displace the mesh to which they are applied. In order for details to be created based on a displacement map, usually the mesh must be subdivided or tessellated so real geometry is created. Like a bump map, a displacement map consists of grayscale values.

At the mesostructure level, finer geometric details such as skin pores and fine creases, to a resolution of up to a tenth of a millimeter, can be modeled. For example, mesostructure of a facial skin can be represented by an 8 k×8 k normal map. At the microstructure level, even finer geometric details to a resolution of below a tenth of a millimeter (e.g., 10 microns) can be modeled.

Figure 3B:
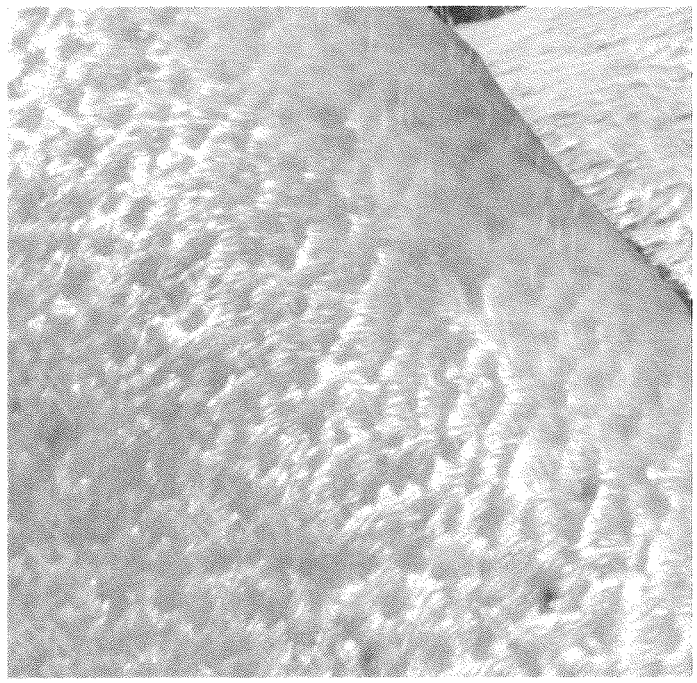
FIG. 3B shows a rendering of the nose area including also microstructure details, according to an embodiment.
Figure 3A:
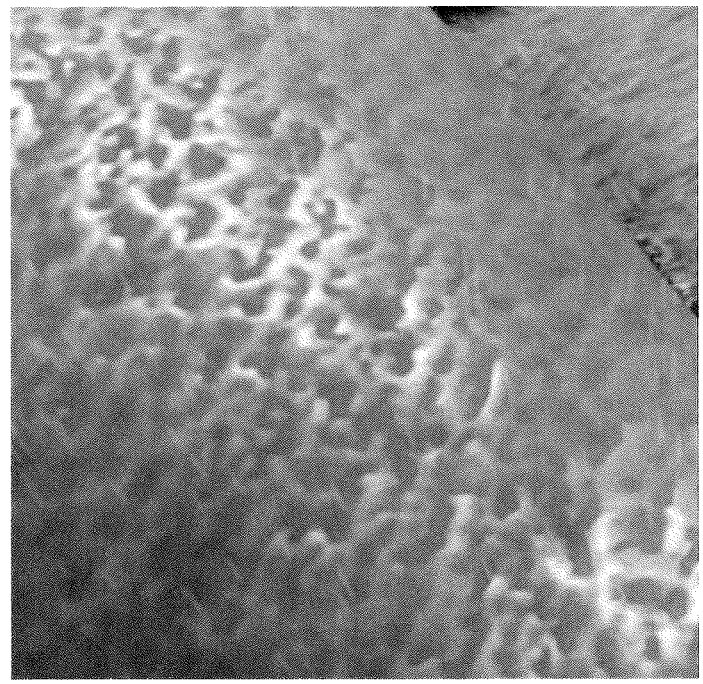
FIG. 3A shows a rendering of a nose area of a person including only mesostructure details, according to an embodiment.

FIG. 3A shows a rendering of a nose area of a person including only mesostructure details (e.g., using an 8 k×8 k normal map), according to one embodiment. FIG. 3B shows a rendering of the nose area including also microstructure details (e.g., using tiled 256×256 normal map), according to one embodiment. When microstructure is not present, skin can appear to be too smooth or shiny, such as shown in FIG. 3A. By adding microstructure, skin can have an even higher level of believability, as in FIG. 3B.

Figure 4A:
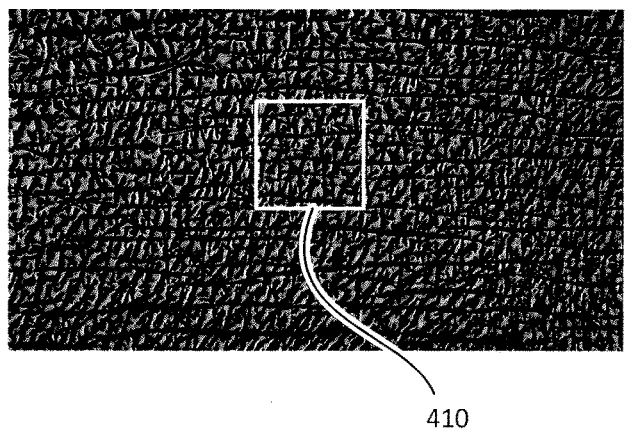
FIG. 4A shows an exemplary displacement map of a region of facial skin, according to an embodiment.
Figure 4B:
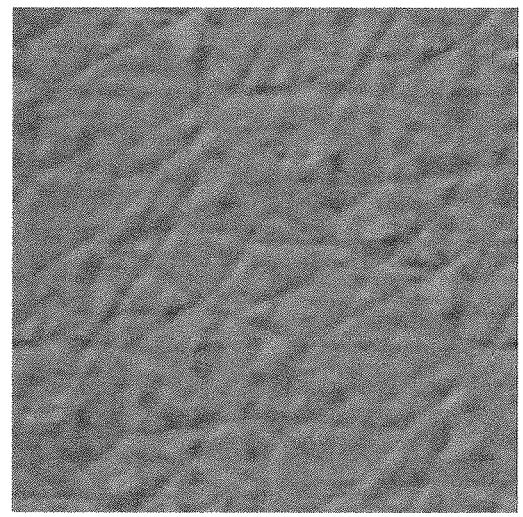
FIG. 4B shows a tangent space normal map converted from a representative patch of the displacement map shown in FIG. 4A, according to an embodiment.
Figure 5A:
FIG. 5A shows a normal map of a forehead with only mesostructure, according to an embodiment.
Figure 5B:
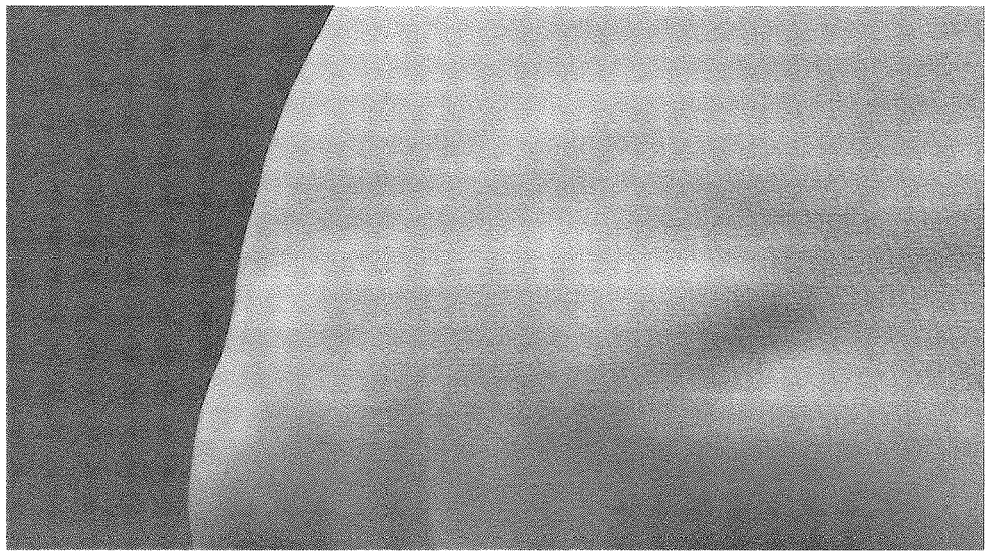
FIG. 5B shows a normal map of the forehead with only microstructure, according to an embodiment.
Figure 5C:
FIG. 5C shows a normal map with the mesostructure combined with the microstructure, according to an embodiment.

FIG. 4A shows an example displacement map of a region of facial skin, according to one embodiment. The displacement map can be obtained, for example, using differently lit photos taken with polarized gradient illumination. A representative patch 410 of the displacement map is converted into a tangent space normal map, as shown in FIG. 4B. The patch 410 can be relatively small (e.g., covering a 5 cm×5 cm area). The normal map is then tiled across a face. To make the tiling appear seamless, certain tiling transformations as known in the art can be used. The microstructure can then be combined with the mesostructure, using techniques such as reoriented normal mapping (RNM) blending. FIG. 5A shows a normal map of a forehead with only mesostructure, according to one embodiment. FIG. 5B shows a normal map of the forehead with only microstructure, according to one embodiment. FIG. 5C shows a normal map with the mesostructure combined with the microstructure, according to one embodiment.

Figure 6C:
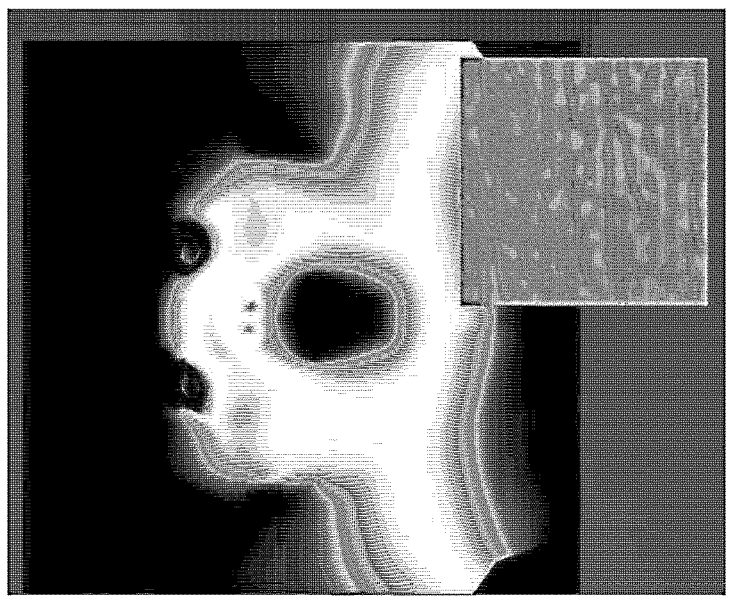
FIGS. 6A, 6B, and 6C show microstructure normal maps for three different regions of the face: (A) the chin, (B) the forehead, and (C) the cheek, and the associated masks, according to some embodiments.
Figure 6B:
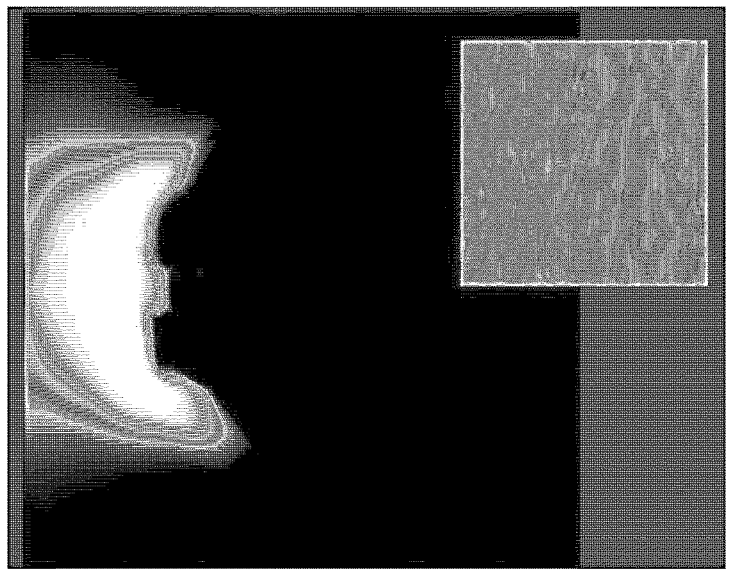
Figure 6A:
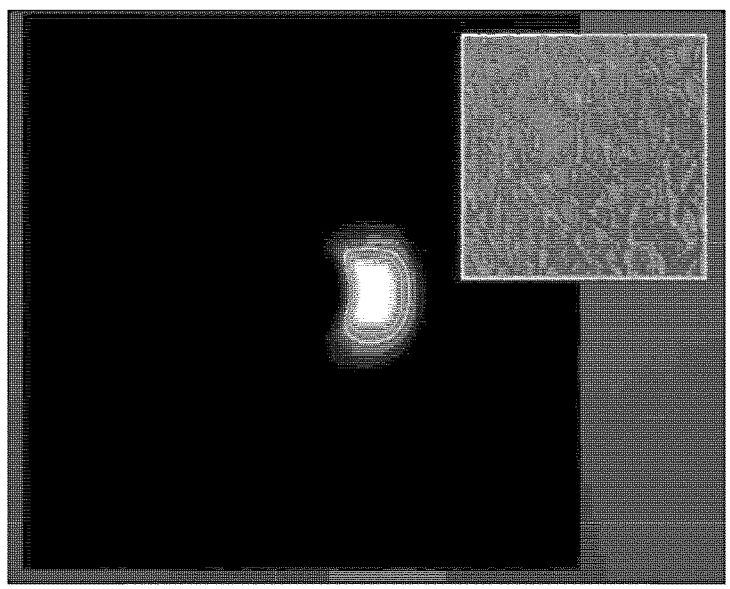

According to some embodiments, microstructure normal maps for three different regions of the face are used. For example, the three different regions can be the chin, the forehead, and the cheek, as illustrated in FIGS. 6A, 6B, and 6C, respectively. Masks can be applied to blend the three microstructure normal maps. For example, for a given triangle on the face, the three microstructure normal maps are blended according to their respective percentages (e.g., 70% chin, 20% cheek, and 10% forehead). Such blending can avoid hard edges or other artifacts. For some areas of the face, such as the mouth, eyelids, and the inside of the eyes, the microstructure can be switched off.

Dynamic deformations of skin microstructure result from the epidermal skin layers being stretched and compressed by motion of the tissues underneath the skin. Since the skin surface is relatively stiff, it develops a rough microstructure to effectively store a reserve of surface area to prevent rupturing when extended. Thus, parts of the skin that stretch and compress significantly, such as the forehead and around the eyes, can be rougher than parts that are mostly static, such as the tip of the nose or the top of the head. When skin stretches, the microstructure flattens out and the skin appears less rough. Under compression, the microstructure bunches up, creating micro-furrows that exhibit anisotropic roughness. Often, stretching in one dimension is accompanied by compression in the perpendicular direction to maintain the area of the surface or the volume of tissues below.

One technique for synthesizing the effects of skin microstructure deformation is by convolving a high-resolution displacement map with a filter kernel to match normal distribution changes in measured skin samples. In this way, the effects of the stretching or compression of skin microstructure are emulated by blurring or sharpening the image. The degree of blurring and sharpening can be determined by measuring in vivo surface microstructure of several skin patches under a range of stretching and compression, and tabulated the changes in their surface normal distributions. The amount of blurring or sharpening is chosen to affect a similar change in surface normal distribution on the microstructure displacement maps.

One embodiment of a filtering operation may be a so-called "box filter." For example, a pixel may be blurred by averaging a 3×3 array of pixels around the pixel. A so-called soft blurring may apply different weights to the pixels. For example, the weights may follow a Gaussian function so that they fall off for farther away pixels. In one embodiment, if a weight is negative instead of positive, then the image is sharpened instead of being blurred. In an alternate embodiment, if a weight is positive instead of negative, then the image is sharpened instead of being blurred.

According to embodiments of the disclosure, a filtering operation can be expressed as a two-dimensional (2D) convolution of a microstructure normal map with a filter kernel. Let D(u,v) be a 2D microstructure normal map of a neutral pose, D'(u,v) be a 2D microstructure normal map of a deformed pose, and K be a 2D filter kernel. The following equation follows:

$$D'(u, v) = \sum_i \sum_j D(u - i, v - j) K(i, j). \quad (1)$$

For an approximately symmetric filter kernel function, the 2D convolution of Equation (1) can be estimated as a sequence of two one-dimensional (1D) convolutions in two orthogonal axes t and s, where $t=(t_u, t_v)$ and $s=(s_u, s_v)$. This can be expressed as the following equations:

$$D^t(u, v) = \sum_i D(u - it_u, v - it_v) k^t(i), \quad (2)$$

$$D'(u, v) \approx \sum_j D^t(u - js_u, v - js_v) k^s(j), \quad (3)$$

where $k^t$ and $k^s$ are the 1D filter kernels in the t axis and s axis, respectively. The 1D convolution of Equation (2) may be referred to as the first pass of the filter, and the 1D convolution of Equation (3) may be referred to as the second pass of the filter.

Using a Gaussian function form for the filter kernels, $k^t$ and $k^s$ can be expressed as the following:

$$k = (1 - \alpha)\delta + \alpha G(\cdot, \sigma), \quad (4)$$

where $\delta$ is the discrete delta function, $\alpha$ and $\sigma$ are the amplitude and the standard deviation, respectively, of the normalized discrete Gaussian kernel G. $\alpha$ and $\sigma$ are referred to as kernel parameters. $\alpha$ may be in the range $-2 \leq \alpha \leq 1$. With $\alpha>0$, the filter blurs the signal; with $\alpha<0$, the filter sharpens the signal; and with $\alpha=0$, the filter preserves the signal.

A stretch ratio r can be used to quantify stretching and compression, where $r>1$ corresponds to stretching, $r<1$ corresponds to compression (here r may also be referred to be compression ratio), and $r=1$ corresponds to neutral pose. The stretch ratio r is also referred herein as filter parameter or filter strength. In one implementation, the kernel parameters, $\alpha$ and $\sigma$, can be expressed as piecewise linear functions of the stretch ratio r. The following functions for $\alpha$ and $\sigma$ can be obtained by fitting linear models to the plots of estimated kernel parameters against the stretch ratio r for a forehead patch:

$$\alpha = \min(1, 15.4r - 13.8, 3.09(r - 1)); \quad (5)$$

$$\sigma = \begin{cases} (38.2r - 26.5)\mu m & \text{if } r \geq 1 \\ (70.5r - 46.9)\mu m & \text{otherwise} \end{cases}. \quad (6)$$

When applying the two-pass filter in runtime animation, after performing the first pass, the intermediate result $D'(u,v)$ would be saved in a memory, so that the second pass can be performed subsequently and combined with results of the first pass. In runtime animation, there may be as little as 5 ms to animate each character in a frame. Thus, there is a need to make the filtering process as efficient as possible.

According to embodiments of this disclosure, multiple instances of the 1D filter $k^t$ are precomputed per microstructure tile at various filter axis angles t and at various filter strengths (e.g., various values of the stretch ratio r, representing various degrees of stretching or compression). Thus, an array of 1D filtered tiles $D_m^t$, m=0, 1, ... n, are generated and stored in memory, where m is an integer number representing a filter index, and n is the total number of 1D filtered tiles in the array (m=0 corresponds to the neutral tile). Each element $D_m^t$ of the array corresponds to a respective filter axis angle and a respective filter strength. For example, the array of 1D filtered tiles can be precomputed for 8 different angles ranging from zero degree to 180 degrees (e.g., 0 degree, 22.5 degrees, 45 degrees, 67.5 degrees, 90 degrees, 112.5 degrees, 135 degrees, and 157.5 degrees), and for 8 different filter strengths (e.g., for stretch ratio r ranging from 1 to 1.4, and for compression ratio r ranging from 1 to 0.7) at each angle. In this example, the array of 1D filtered tiles $D_m^t$ would include 64 elements (i.e., m=0, 1, ... 63).

At runtime, for each pixel of the pixel shader identified as including facial skin, the system determines a principal direction and a secondary direction of deformation, and the associated filter strengths in those directions, based on the deformation of the corresponding triangle in the triangular mesh with respect to that in the neutral triangular mesh. This can be achieved by performing certain linear algebraic calculations.

For example, consider a triangle P with $v_0$, $v_1$, and $v_2$ being the vertices on the neutral triangular mesh, and the deformed triangle P' with $v_0'$, $v_1'$, and $v_2'$ being the vertices. A rotation R can be computed that maps the triangle P in 3D space into 2D tangent space. Similarly, a rotation R' can be computed that maps the triangle P' into 2D tangent space. A linear transformation T can be computed that maps the 2D neutral triangle RP into the deformed triangle R'P' as follows:

$$[e_1' e_2'] = T[e_1 e_2], \quad (7)$$

where $e_i$ is an edge from $Rv_0$ to $Rv_i$, and $e_i'$ is an edge from $R'v_0'$ to $R'v_i'$.

By performing a singular value decomposition (SVD) of the form:

$$T = U \sum V^T, \quad (8)$$

the following matrix can be obtained:

$$\sum = \begin{bmatrix} r_s & 0 \\ 0 & r_t \end{bmatrix}, \quad (9)$$

where $r_s$ and $r_t$ are the stretch ratios, in the principal direction of deformation s and in the secondary direction of deformation t, respectively. Substituting the values of $r_s$ and $r_t$ into the kernel models as expressed in Equations (4), (5) and (6), the kernel functions $k^s$ and $k^t$ can be obtained.

According to embodiments of this disclosure, for the first pass of the filter, namely the 1D filtering in the secondary direction of deformation $k^t$, the system selects an element $D_l^t$ of the precomputed array of 1D filtered tiles $D_m^t$, where the element $D_l^t$ corresponds to the secondary direction of deformation t and the associated stretch ratio $r_t$. The system then applies the second pass of the filter in the principal direction of deformation s by convolving $D_l^t$ with the filter kernel $k^s$ with the associated stretch ratio $r_s$. In some embodiments, the principal direction of deformation s is chosen as the direction in which the filter strength is stronger (e.g., $r_s > r_t$), so that the filtering along the principal direction of deformation is calculated at runtime for better fidelity.

As described above, the precomputed array of 1D filtered tiles $D_m^t$, m=0, 1, ... n is stored as static memory. At runtime, only a single 1D filtering needs to be performed. No intermediate results need to be saved during runtime. Therefore, the filtering can be performed more efficiently under the time constraints of runtime animation. Because each microstructure tile is relatively small (e.g., 250×250 pixels), the precomputed array of 1D filtered tiles can take as little as about 2 to 24 MB of memory in some example implementations. In addition, because the microstructure tile is small, the second pass of the filter in the principal direction of deformation s can also be computed efficiently at runtime.

It is possible that, neighboring triangles with slightly different orientations may result in selections of different elements of the precomputed array of 1D filtered tiles $D_m^t$. To avoid hard edges and other artifacts, for each pixel, a linear interpolation between two adjacent elements may be used. For example, the two adjacent elements may correspond to two neighboring filter axis angles adjacent to the secondary direction of deformation t. An interpolation factor can be used for the linear interpolation. This can ensure smooth transitions among neighboring pixels.

According to some embodiments, because each microstructure tile is small and is tiled across a face, the system can use periodic boundary conditions when performing the filter operation to match how the tiles are sampled at runtime. As discussed above, the filter operation can be considered as a "weighted average" of neighboring pixels. For pixels at or adjacent the border of the microstructure tile, there would be no neighboring pixels on the other side of the border for the "averaging". To ensure that there are no seams or other artifacts, pixels that are identified as being on one edge of the microstructure tile are wrapped around to the opposite edge of the microstructure tile. For example, pixels at the bottom of the microstructure tile are wrapped around to the top of the microstructure tile. Such periodic boundary conditions are consistent with the tiling of the microstructure tile.

Figure 7:
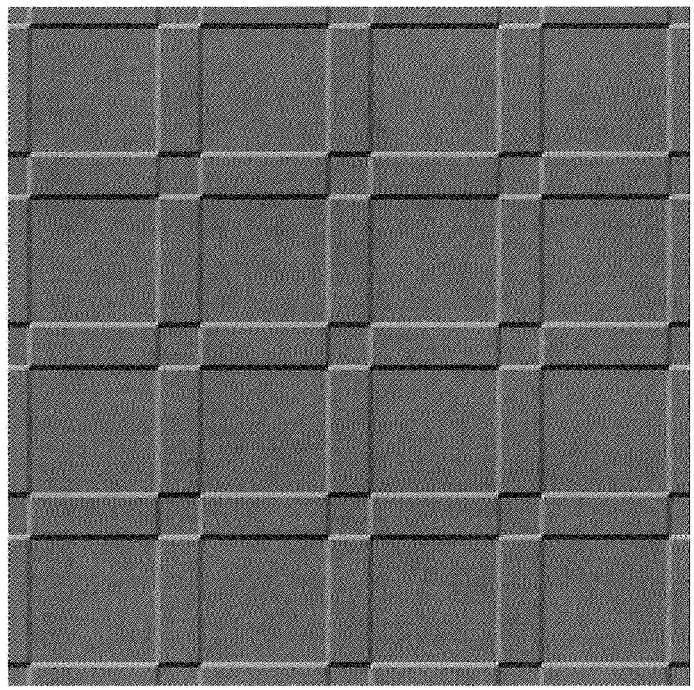
FIG. 7 shows an example of a test texture tile, according to an embodiment.
Figure 8A:
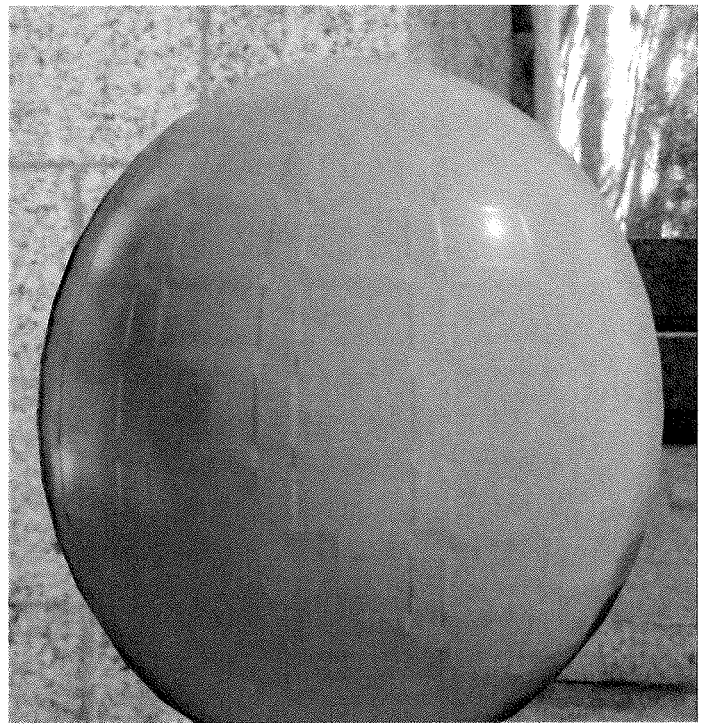
FIGS. 8A and 8B show two example animation screenshots when the test texture tile is applied to a deforming surface according to some embodiments.
Figure 8B:

FIG. 7 shows an example of a test texture tile, according to one embodiment. FIGS. 8A and 8B show two example animation screenshots when the test texture tile is applied to a deforming surface (e.g., in the shape of an elastic ball).

Figure 9:
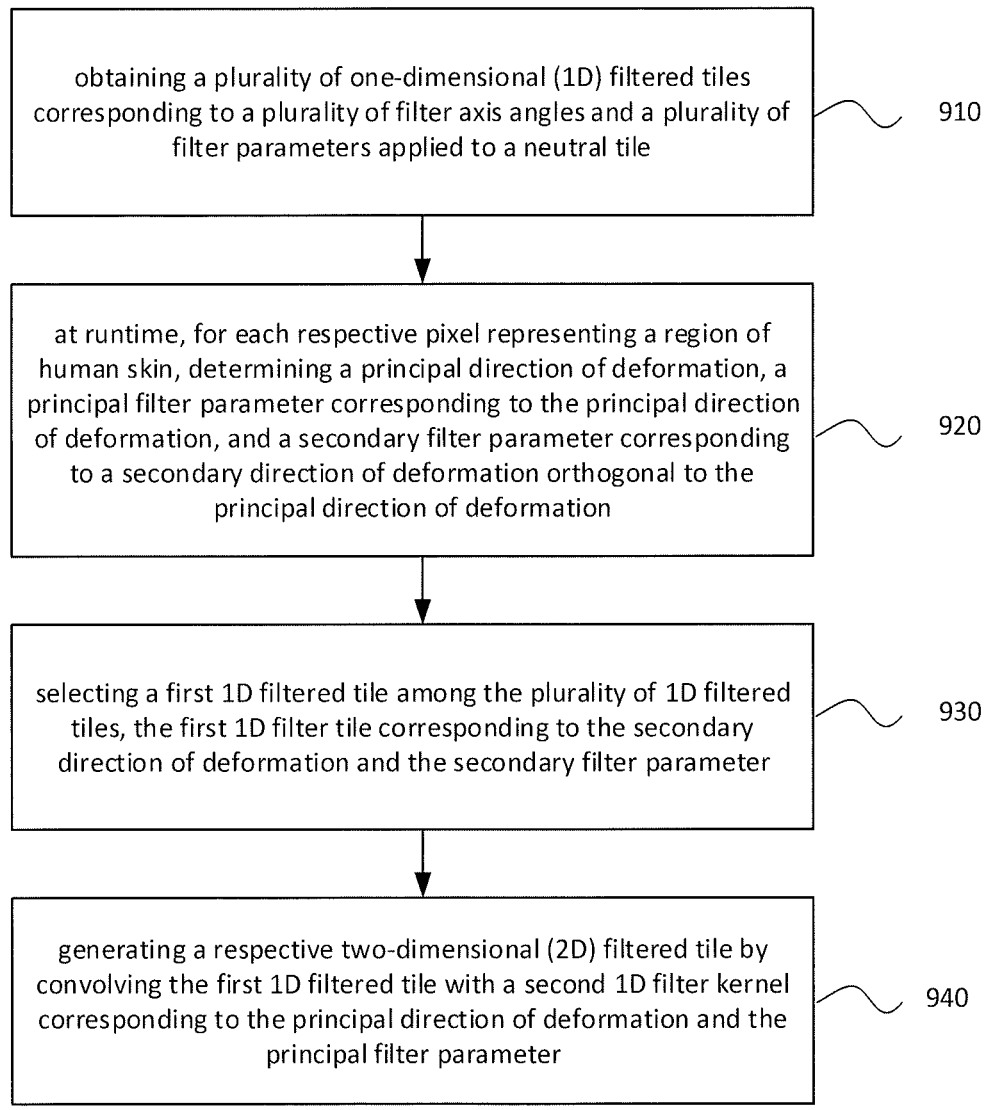
FIG. 9 is a flow diagram of method steps for skin microstructure texture filtering for facial animation according to some embodiments.

FIG. 9 is a flow diagram of method steps for skin microstructure texture filtering for facial animation according to some embodiments. In various implementations, the method can be performed by the processor 110, the graphics processor 116, or a combination of the processor 110 and the graphics processor 116.

The method includes, at 910, obtaining a plurality of one-dimensional (1D) filtered tiles corresponding to a plurality of filter axis angles and a plurality of filter parameters applied to a neutral tile. The neutral tile comprises a microstructure texture of human skin. According to some embodiments, the neutral tile comprises a normal map, a displacement map, or an albedo map. In some embodiments, the neutral tile is obtained by blending a first neutral tile representing a chin area, a second neutral tile representing a cheek area, and a third neutral tile representing a forehead area, using assigned weights to each area.

In some embodiments, the plurality of filter axis angles ranges from 0 degree to 180 degrees. Each respective filter parameter can be a positive real number corresponding to a degree of stretching or compression of the human skin. In some embodiments, a filter parameter that is greater than unity represents a stretch ratio, and the 1D filter kernel corresponds to a blurring operation; and a filter parameter that is less than unity represents a compression ratio, and the 1D filter kernel corresponds to a sharpening operation.

In some embodiments, the plurality of 1D filtered tiles is generated by, for each respective filter axis angle and each respective filter parameter, computing a respective 1D filtered tile by convolving the neutral tile with a respective 1D filter kernel corresponding to the respective filter axis angle and the respective filter parameter.

The method further includes, at 920, at runtime, for each respective pixel representing a region of the human skin, determining a principal direction of deformation, a principal filter parameter corresponding to the principal direction of deformation, and a secondary filter parameter corresponding to a secondary direction of deformation orthogonal to the principal direction of deformation.

The method further includes, at 930, selecting a first 1D filtered tile among the plurality of 1D filtered tiles. The first 1D filter tile corresponds to the secondary direction of deformation and the secondary filter parameter. In some embodiments, selecting the first 1D filtered tile includes selecting a second 1D filtered tile and a third 1D filtered tile among the plurality of 1D filtered tiles, the second 1D filtered tile and the third 1D filtered tile corresponding to a second filter axis angle and a third filter axis angle adjacent the secondary direction of deformation, determining an interpolation factor, and determining the first 1D filtered tile by linearly interpolating between the second 1D filtered tile and the third 1D filter tile using the interpolation factor.

The method further includes, at 940, generating a respective two-dimensional (2D) filtered tile by convolving the first 1D filtered tile with a second 1D filter kernel corresponding to the principal direction of deformation and the principal filter parameter. In some embodiments, the principal filter parameter is greater than the secondary filter parameter.

Below is provided one example of pseudocode for generating an array of 1D filtered tiles $D_m^t$ by computing multiple instances of the 1D filter $k^t$ at various filter axis angles t and at various filter strengths is provided below. Also provided is pseudocode for selecting an element $D_l^t$ of the precomputed array of 1D filtered tiles $D_m^t$ at runtime, where the element $D_l^t$ corresponds to the secondary direction of deformation t and the associated stretch ratio $r_t$ determined for each pixel in the pixel shader, as described above.

```
####################################################
# Preprocessing stage - pre-filter the tile texture
####################################################
import numpy as np
angleCount = 8
filterParamCount = 8
filterKernelSize = 30
maxStretch = 1.4
maxCompression = 0.7
SMALL_FLOAT = 1e-5
def main( ):
    originalTile = loadImage('tile.dds')
    # First element of the texture array is the original image, followed by
images with different filters applied
    preFilteredTiles = [originalTile]
    # Next set of elements is increasing compression towards
maxCompression,
```

```
        # and then increasing stretch towards maxStretch
        for filterFactor in [maxCompression, maxStretch]:
            for angleIndex in range(angleCount):
                for filterParamIndex in range(filterParamCount):
                    # Work out angle and filter parameters
                    angleInDegrees = (angleIndex / angleCount) * 180
                    # kernel_factors is the fitted filter kernel model
                    lerpFactor = (filterParamIndex+1) / filterParamCount
                    kernelFactor = filterFactor*lerpFactor + (1-
lerpFactor)
                    (alpha, sigma) = kernel_factors(kernelFactor)
                    # Construct filter kernel
                    filterKernelTapCount = filterKernelSize * 2 + 1
                    # Start with empty 61×61 kernel
                    filterKernel = np. zeros((filterKernelTapCount,
filterKernelTapCount))
                    # Place a 1d gaussian in the middle row of the kernel
                    filterKernel[filterKernelSize, :] =
gaussian (std=sigma)
                    # Rotate the kernel by the angle we want
                    filterKernel = rotateImage(filterKernel,
angleInDegrees)
                    # Normalize
                    filterKernel = filterKernel / np.sum(filterKernel)
                    # Lerp factor from the parameterized model
                    filterKernel = alpha * filterKernel
                    # Add the central spike from the parameterized model
                    filterKernel[filterKernelSize, filterKernelSize] +=
(1-alpha)
                    # Use the constructed kernel to filter the image
                    filteredImage = filter(originalTile, filterKernel)
                    # Place into tile texture array
                    preFilteredTiles.append(filteredImage)
    # Save as a texture array that we can use in the pixel shader
    saveImage(preFilteredTiles, 'preFiltered.dds')
################################################################
############
# When shading pixels, calculate the stretch normal by selecting a slice of
the tile array
################################################################
############
# This finds which index of the texture array computed above corresponds to
the beginning of the index range
# for a given filter parameter.
# Two indices and a factor for interpolating between them are returned.
# This allows us to prevent sharp discontinuities appearing where
neighbouring pixels would select different
# texture slices due to slightly different stretch params.
def computeIndicesFromStretch(sy):
    # sy < 1 corresponds to compression
    if sy < 1:
        fpIndex = ((filterParamCount-1) - SMALL_FLOAT)*saturate((sy-
1)/(maxCompression-1))
        i0 = floor(fpIndex)
        i0 = i0 if i0 == 0 else 1 + i0*angleCount
        i1 = ceil(fpIndex)
        i1 = i1 if i1 == 0 else 1 + i1*angleCount
        lerpFactor = fmod(fpIndex, 1.0)
    # sy > 1 corresponds to stretch
    else:
        fpIndex = ((filterParamCount-1) - SMALL_FLOAT)*saturate((sy-
1)/(maxStretch-1))
        i0 = floor(fpIndex)
        i0 = i0 if i0 == 0 else 1 + filterParamCount*angleCount +
i0*angleCount
        i1 = ceil(fpIndex)
        i1 = i1 if i1 == 0 else 1 + filterParamCount*angleCount +
i1*angleCount
        lerpFactor = fmod(fpIndex, 1.0)
    return (i0, i1, lerpFactor)
# This is written like python but it would really be a function in an hlsl
pixel shader
def stretchNormal(
        textureArray, # Texture array computed above
        textureCoord, # texture coordinates of this place on the face
(u,v)
        tMatrix): # T matrix
    # Get angle and stretch factors of facial stretch at this point
    # (KN equation 11, 12)
```

```
    # factors have been sorted so that sy is the less significant factor
(ie abs(sx) >= abs(sy))
    (angle, sx, sy) = svd(tMatrix)
    # Find indices of the set of slices in the texture array corresponding
to the sy filter param
    (i0, i1, lerpFactor) = computeIndices FromStretch(sy)
    # Compute change to index caused by the required angle
    # The angle given above is for the primary axis sx but we need the
angle corresponding
    # to sy which is an extra quarter rotation
    secondaryAngle = angle + 0.5*pi
    # Negative angles should wrap around
    secondaryAngle = secondaryAngle if secondaryAngle >= 0 else 2*pi +
secondaryAngle
    secondaryAngle = fmod(secondaryAngle, pi)
    # texture array index increment due to the required angle
    angleIndex = (angleCount * saturate(secondaryAngle / pi))
    # Add angle index to filter index, except if filter index is 0
    # because this corresponds to the unfiltered image.
    sliceIndex0 = i0 + (0 if i0 == 0 else angleIndex)
    sliceIndex1 = i1 + (0 if i1 == 0 else angleIndex)
    # Go on to sample the selected slices to compute the primary stage of
the filtering process
    # This proceeds in a way for linearly blurring a texture in a pixel
shader
    return lerp(
        linearFilterTexture(textureArray[sliceIndex0], textureCoord, sx,
angle),
        linearFilterTexture(textureArray[sliceIndex1], textureCoord, sx,
angle),
        lerpFactor)
```

As described above, embodiments of this disclosure provide a method of skin microstructure texture filtering for facial animation. The method can emulate the effects of skin stretching or compression efficiently at runtime by blurring or sharpening the microstructure texture in the pixel shader. The method applies a two-pass filter on regions of tiled microstructure texture. Multiple instances of the 1D filter are precomputed per microstructure tile at various filter axis angles and at various filter strengths (e.g., various degrees of stretching or compression). Thus, an array of 1D filtered tiles are generated and stored in a memory. At runtime, for each pixel of the pixel shader that is determined to include skin (e.g., not occluded), the system selects, as the first pass of the filter, an element of the precomputed array of 1D filtered tiles that corresponds to the secondary direction of deformation and the secondary filter strength. The system then applies the second pass of the filter corresponding to the principal direction of deformation and the principal filter strength to the selected element. Because a microstructure tile can be relatively small, storing the precomputed array of 1D filtered tiles may not substantially affect memory. By querying the precomputed results for the first pass of the filtering, applying the second pass of the filter can then be performed more efficiently at runtime.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method of skin microstructure texture filtering for facial animation, the method comprising:
    obtaining a plurality of one-dimensional (1D) filtered tiles corresponding to a plurality of filter axis angles and a plurality of filter parameters applied to a neutral tile, the neutral tile being a microstructure texture of human skin; and
    at runtime, for each respective pixel representing a region of the human skin:
        determining a principal direction of deformation, a principal filter parameter corresponding to the principal direction of deformation, and a secondary filter parameter corresponding to a secondary direction of deformation orthogonal to the principal direction of deformation;
        selecting a first 1D filtered tile among the plurality of 1D filtered tiles, the first 1D filter tile corresponding to the secondary direction of deformation and the secondary filter parameter; and
        generating a respective two-dimensional (2D) filtered tile by convolving the first 1D filtered tile with a second 1D filter kernel corresponding to the principal direction of deformation and the principal filter parameter.

2. The method of claim 1, further comprising:
    generating the plurality of 1D filtered tiles corresponding to the plurality of filter axis angles and the plurality of filter parameters by:
        for each respective filter axis angle and each respective filter parameter, computing a respective 1D filtered tile by convolving the neutral tile with a respective 1D filter kernel corresponding to the respective filter axis angle and the respective filter parameter.

3. The method of claim 2, wherein each respective 1D filter kernel comprises a Gaussian function with an amplitude $\alpha$ and a standard deviation $\sigma$, wherein $\alpha$ and $\sigma$ are functions of the respective filter parameter.

4. The method of claim 2, wherein the plurality of filter axis angles ranges from 0 degree to 180 degrees.

5. The method of claim 2, wherein each respective filter parameter is a positive real number corresponding to a degree of stretching or compression of the human skin.

6. The method of claim 4, wherein:
    based on the respective filter parameter being greater than unity, the respective filter parameter represents a stretch ratio, and the respective 1D filter kernel corresponds to a blurring operation; and
    based on the respective filter parameter being less than unity, the respective filter parameter represents a compression ratio, and the respective 1D filter kernel corresponds to a sharpening operation.

7. The method of claim 4, wherein plurality of filter parameters ranges from 0.7 to 1.4.

8. The method of claim 1, wherein the principal filter parameter is greater than the secondary filter parameter.

9. The method of claim 1, wherein selecting the first 1D filtered tile comprises:
    selecting a second 1D filtered tile and a third 1D filtered tile among the plurality of 1D filtered tiles, the second 1D filtered tile and the third 1D filtered tile corresponding to a second filter axis angle and a third filter axis angle adjacent the secondary direction of deformation;
    determining an interpolation factor; and
    determining the first 1D filtered tile by linearly interpolating between the second 1D filtered tile and the third 1D filter tile using the interpolation factor.

10. The method of claim 1, wherein the neutral tile is tiled across an image of a face, and wherein a periodic boundary condition is applied to the computation of the respective 1D filtered tile by wrapping pixels at or adjacent an edge of the neutral tile around to an opposite edge of the neutral tile.

11. The method of claim 1, wherein the neutral tile comprises a normal map, a displacement map, or an albedo map.

12. The method of claim 1, wherein the neutral tile is obtained by combining a first neutral tile representing a chin area, a second neutral tile representing a cheek area, and a third neutral tile representing a forehead area.

13. The method of claim 12, wherein combining the first neutral tile, the second neutral tile, and the third neutral tile comprises a weighted blending of the first neutral tile, the second neutral tile, and the third neutral tile.

14. A non-transitory computer-readable storage medium storing instructions that, when executed by one or more processors, cause a computing device to perform microstructure texture filtering for animation of human skin, by performing the steps of:
    obtaining a plurality of one-dimensional (1D) filtered tiles corresponding to a plurality of filter axis angles and a plurality of filter parameters applied to a neutral tile, the neutral tile being a microstructure texture of human skin; and
    at runtime, for each respective pixel representing a region of the human skin:
        determining a principal direction of deformation, a principal filter parameter corresponding to the principal direction of deformation, and a secondary filter parameter corresponding to a secondary direction of deformation orthogonal to the principal direction of deformation;
        selecting a first 1D filtered tile among the plurality of 1D filtered tiles, the first 1D filter tile corresponding to the secondary direction of deformation and the secondary filter parameter; and
        generating a respective two-dimensional (2D) filtered tile by convolving the first 1D filtered tile with a second 1D filter kernel corresponding to the principal direction of deformation and the principal filter parameter.

15. The non-transitory computer-readable storage medium of claim 14, wherein the instructions, when executed by the one or more processors, further cause the computing device to perform the steps of:
generating the plurality of 1D filtered tiles corresponding to the plurality of filter axis angles and the plurality of filter parameters by:
for each respective filter axis angle and each respective filter parameter, computing a respective 1D filtered tile by convolving the neutral tile with a respective 1D filter kernel corresponding to the respective filter axis angle and the respective filter parameter.

16. The non-transitory computer-readable storage medium of claim 15, wherein each respective 1D filter kernel comprises a Gaussian function with an amplitude $\alpha$ and a standard deviation $\sigma$, wherein $\alpha$ and $\sigma$ are functions of the respective filter parameter.

17. A device for performing microstructure texture filtering for animation of human skin, the device comprising:
a memory storing instructions; and
one or more processors configured to execute the instructions to cause the device to:
obtain a plurality of one-dimensional (1D) filtered tiles corresponding to a plurality of filter axis angles and a plurality of filter parameters applied to a neutral tile, the neutral tile being a microstructure texture of human skin; and
at runtime, for each respective pixel representing a region of the human skin:
determine a principal direction of deformation, a principal filter parameter corresponding to the principal direction of deformation, and a secondary filter parameter corresponding to a secondary direction of deformation orthogonal to the principal direction of deformation;
select a first 1D filtered tile among the plurality of 1D filtered tiles, the first 1D filter tile corresponding to the secondary direction of deformation and the secondary filter parameter; and
generate a respective two-dimensional (2D) filtered tile by convolving the first 1D filtered tile with a second 1D filter kernel corresponding to the principal direction of deformation and the principal filter parameter.

18. The device of claim 17, wherein the instructions, when executed by the one or more processors, further cause the device to:
generate the plurality of 1D filtered tiles corresponding to the plurality of filter axis angles and the plurality of filter parameters by:
for each respective filter axis angle and each respective filter parameter, computing a respective 1D filtered tile by convolving the neutral tile with a respective 1D filter kernel corresponding to the respective filter axis angle and the respective filter parameter.

19. The device of claim 18, wherein each respective 1D filter kernel comprises a Gaussian function with an amplitude $\alpha$ and a standard deviation $\sigma$, wherein $\alpha$ and $\sigma$ are functions of the respective filter parameter.

20. The device of claim 17, wherein the selection of the first 1D filtered tile comprises:
selecting a second 1D filtered tile and a third 1D filtered tile among the plurality of 1D filtered tiles, the second 1D filtered tile and the third 1D filtered tile corresponding to a second filter axis angle and a third filter axis angle adjacent the secondary direction of deformation;
determining an interpolation factor; and
determining the first 1D filtered tile by linearly interpolating between the second 1D filtered tile and the third 1D filter tile using the interpolation factor.

* * * * *